United States Patent
Tymes

(10) Patent No.: US 7,411,772 B1
(45) Date of Patent: Aug. 12, 2008

(54) CASIMIR EFFECT CONVERSION

(76) Inventor: Adrian Jeremy Tymes, 2375 Adele Ave., Mountain View, CA (US) 94043

( * ) Notice: Subject to any disclaimer, the term of this patent is extended or adjusted under 35 U.S.C. 154(b) by 386 days.

(21) Appl. No.: 11/328,427

(22) Filed: Jan. 8, 2006

Related U.S. Application Data

(60) Provisional application No. 60/642,172, filed on Jan. 7, 2005.

(51) Int. Cl.
*H02N 11/00* (2006.01)
*H02N 1/00* (2006.01)

(52) U.S. Cl. .................. 361/233; 361/226; 363/178; 327/603; 318/16; 318/555; 318/558; 307/151

(58) Field of Classification Search .............. 361/233, 361/226; 363/178; 327/603; 318/16, 555, 318/558; 307/151
See application file for complete search history.

(56) References Cited

U.S. PATENT DOCUMENTS

| | | | |
|---|---|---|---|
| 5,259,710 A | 11/1993 | Charles | |
| 5,386,741 A | 2/1995 | Rennex | |
| 5,392,663 A | 2/1995 | Charles | |
| 5,531,407 A | 7/1996 | Austin et al. | |
| 5,659,477 A | 8/1997 | Collins | |
| 5,771,747 A | 6/1998 | Sheldon | |
| 5,988,845 A | 11/1999 | Murata | |
| 6,155,758 A | 12/2000 | Wieland et al. | |
| 6,211,960 B1 | 4/2001 | Hembree | |
| 6,233,502 B1 | 5/2001 | Yim | |
| 6,477,028 B1 * | 11/2002 | Pinto | 361/233 |
| 6,487,454 B1 | 11/2002 | Tymes | |
| 6,742,380 B2 * | 6/2004 | Johnston | 73/1.89 |
| 2007/0241470 A1 * | 10/2007 | Haisch et al. | 264/1.27 |

OTHER PUBLICATIONS

Farhi et al. "Heavy fermion quantum effects in SU(2)L Gauge Theory." Nuclear Physics B665, 2003, 623-648.

Farhi et al. "Fractional and integer charges from Levinson's Theorem." Nuclear Physics B595, 2001, 536-550.

Farhi et al. "Searching for quantum solitons in a 3+1 dimensional chiral Yukawa model." Nuclear Physics B630, 2002, 241-268.

Graham et al. "Casimir energies in light of quantum field theory." Physics Letters B572, 2003, 196-201.

(Continued)

*Primary Examiner*—Nikita Wells
(74) *Attorney, Agent, or Firm*—Swernofsky Law Group PC

(57) ABSTRACT

Techniques in which a $1^{st}$ force, field, or effect caused by a Casimir effect is converted into a $2^{nd}$ force, field, or effect. The $1^{st}$ force, field, or effect might be distinct from the $2^{nd}$ force, field, or effect only in the net vector or might be distinct in other ways. For example, the distinction might involve substituting a torque for a linear force vector or converting a force, field, or effect associated with the Casimir effect into movement or into an electric, magnetic, or electromagnetic force, field, or effect. These changes preferably are caused by an independent element placed proximate or between to the Casimir effect surfaces. Preferably, the torque causes rotation (i.e., spinning) of an element. This rotation is significantly different from prior-art embodiment because energy does not have to be put back into the system to "reset" the structures.

33 Claims, 12 Drawing Sheets

OTHER PUBLICATIONS

Graham et al. "Finite energy sum rules in potential scattering." Annals of Physics 293, 2001, 240.

Graham et al. "Quantum energies of interfaces." Physics Review Letters 87, 2001, 131601.

Graham et al. "Casimir Effects in renormalizable quantum field theories." International Journal of Modern Physics A17, 2002, 846-869.

Graham et al. "Calculating vacuum energies in renormalizable quantum field theories: a new approach to the Casimir Problem." Nuclear Physics B645, 2002, 49-84.

Graham et al. "The Dirichlet Casimir Problem." Nuclear Physics B677, 2004, 379-404.

Hall. "What I want to be when I grow up, is a cloud." Extropy Magazine, 1994, http://www.kurzweilai.net/meme/frame.html?main=/articles/art0219.html.

Jaffe. "The Casimir Effect and the quantum vacuum." Physics Review D72, 2005, 021301.

Jaffe. "Delocalization of the axial charge in the chiral limit." Physics Letters B529, 2002, 105-110.

Jaffe. "Open questions in high energy spin physics." International Journal of Modern Physics A18, 2003, 1141-1152.

Jaffe. "SPIN: Progress and prospects." Talk presented at SPIN2000, Oct. 30, 2000.

Jaffe. "The spin structure of the nucleon: theoretical overview." AIP Conference Proceedings 588, 2001, 54-74.

Jaffe et al. "Casimir buoyancy." Journal of High Energy Physics 0506, 2005, 006.

Jaffe et al. "The Casimir Effect and geometric optics." Physics Review Letters 92, 2004, 070402.

Jaffe et al. "A perspective on pentaquarks." European Physics Journal C33, 2004, S38-S42.

Scardicchio et al. "Casimir Effects: an optical approach. I. Foundations and examples." Nuclear Physics B704, 2005, 552-582.

Schroder et al. "Casimir energy for a hyperboloid facing a plate in the optical approximation." Physics Review A72, 2005, 012105.

Schuster et al. "Quantum mechanics on manifolds embedded in Euclidean space." Annals of Physics 307, 2003, 132-143.

Sundberg et al. "The Casimir Effect for fermions in one dimension." Annals of Physics 309, 2004, 442-458.

* cited by examiner

CASIMIR EFFECT CONVERSION

CROSS REFERENCE TO RELATED APPLICATION

The application claims priority from, and hereby incorporates by reference, U.S. Provisional Application No. 60/642,172, Generating a Torque from the Casimir Effect, filed Jan. 7, 2005, in the name of the same inventor, Express Mail No. EL 768 963 465 US.

BACKGROUND OF THE INVENTION

The Casimir effect is a known effect in physics, in which an attraction or repulsion exists between closely spaced objects. The Casimir effect is believed to be quantum mechanical in nature, as explained at Wolfram Scienceworld (Casimir Effect) (http://scienceworld.wolfram.com/physics/Casimir-Effect.html), and in *New Developments in the Casimir Effect*, M. Bordag, U. Mohideen, and V. M. Mostepanenko, Elsevier Preprint (November 2005). This interpretation is disputed by some, cf., *The Casimir Effect and the Quantum Vacuum*, R. Jaffe, Phys. Rev. D72 (2005). While the Casimir effect has little effect on objects at human-scale, it has been precisely measured and is assuredly real.

Attempts have been made to convert or to extract energy using movement of closely spaced parallel plates together as a result of the Casimir effect. However, as much energy is needed to reset the plates by pulling the plates apart as can be extracted from movement of the plates together. Therefore, no net energy has been converted or extracted in these prior-art attempts.

SUMMARY OF THE INVENTION

The invention provides techniques in which a $1^{st}$ force, field, or effect caused by a Casimir effect is converted into a $2^{nd}$ force, field, or effect. The $1^{st}$ force, field, or effect might be distinct from the $2^{nd}$ force, field, or effect only in the net vector or might be distinct in other ways. For example, the distinction might involve substituting a torque for a linear force vector or converting a force, field, or effect associated with the Casimir effect into movement or into an electric, magnetic, or electromagnetic force, field, or effect. In one aspect, the $2^{nd}$ force, field, or effect includes changes to the $1^{st}$ force, field, or effect. These changes preferably are caused by an independent element placed proximate or between to the Casimir effect surfaces.

In one set of preferred embodiments, the independent element might shield a portion of the Casimir effect, with the effect that a force resulting from the Casimir effect is diverted to an angle from the normal angle that would otherwise apply between two parallel plates. In these preferred embodiments, the independent element itself might be subject to a force resulting from the Casimir effect, with the result that a linear force vector resulting from the Casimir effect on the independent element is converted to a torque on the independent element.

In the context of the invention, there is no particular requirement that the independent element shields a portion of the Casimir effect. For example, the independent element might have other effects (in addition or otherwise), such as to enhance, divert, delay, twist, or otherwise convert a force resulting from the Casimir effect into a different force. In alternative embodiments of the invention, the independent element might have these other effects by enhancing interaction with one or the other of the parallel plates, by interacting with one or the other of the parallel plates, by generating or converting or altering another type of force or effect, or by some other technique.

One apparatus that uses these techniques include a first structure effective to generate a Casimir effect between at least portions thereof, and a second structure effective to alter or to convert the Casimir effect or a first type of force, field, or affect associated with the Casimir effect into a second type of force, field, or effect. In some embodiments, the first structure includes elements effective to generate the Casimir effect, and the second structure includes an element substantially interposed between at least portions of the elements of the first structure.

One embodiment of a device that uses the Casimir effect includes two surfaces spaced apart by less than or equal to an effective distance of the Casimir effect. The device also includes a material present between the two surfaces such that a first net vector of force from the Casimir effect between portions of the two surfaces is different from a second net vector of force that would result from the Casimir effect between the portions if the material was not present between the two surfaces. The first net vector of force is used to generate, convert, or alter another force, field, or effect.

In some embodiments, the two surfaces are a curved surface and a surface of a structure located within a curvature of the curved surface. For example, the curved surface could be a surface of a ring-like structure, and the structure located within the curvature of the curved surface could be a post located at a center of the ring-like structure.

The first net vector of force can apply a torque to either or both of the ring-like structure and the post. This torque can cause either or both of the ring-like structure and the post to rotate relative to each other. If either or both of the ring-like structure and the post is subject to a magnetic field and is conductive, rotation of either or both of the ring-like structure and the post can convert the magnetic field into a current. This current can be drawn off with one or more leads.

In some embodiments that use the ring-like structure, the ring-like structure includes a gear. This gear can be used to drive a larger gear. Plural of the devices can work in concert to drive the larger gear. This larger gear in turn can be subject to a magnetic field, and rotation of the larger gear can convert the magnetic field into a current that can be drawn off with leads.

In other embodiments, the first net vector of force can apply a sheer force instead of or in addition to the torque, to similar ends.

DESCRIPTION OF THE PREFERRED EMBODIMENT

Figure 1:
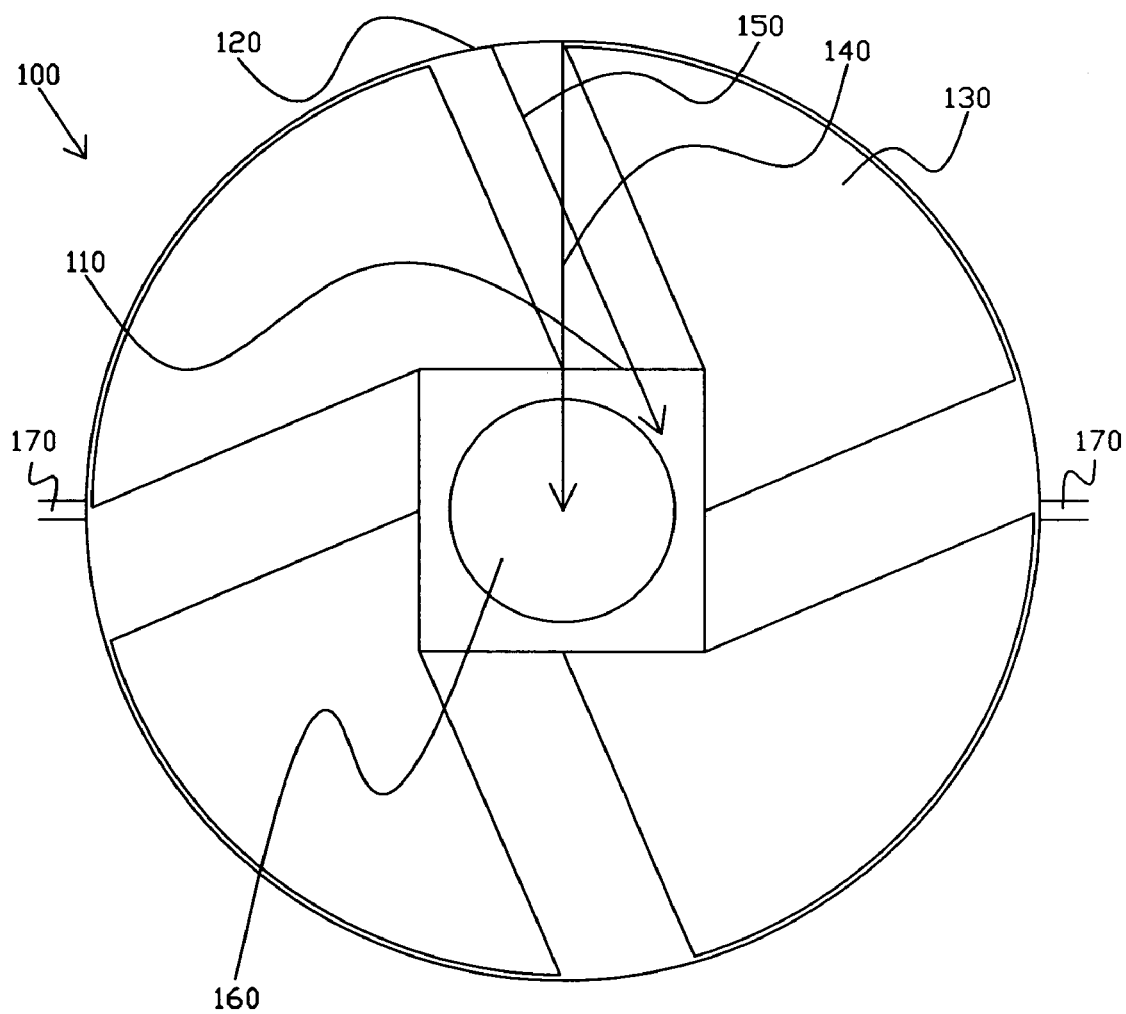
FIG. 1 shows a conceptual diagram of one embodiment of a device that uses the Casimir effect to generate, convert, or alter another force, field, or effect.

FIG. 1 shows a conceptual diagram of one embodiment of a device that uses the Casimir effect to generate, convert, or alter another force, field, or effect.

Briefly, one embodiment of the invention is an apparatus including at least a first structure and a second structure. The first structure is effective to generate a Casimir effect between at least portions thereof. The second structure is effective to alter or to convert the Casimir effect or a first type of force, field, or affect associated with the Casimir effect into a second type of force, field, or effect.

In more detail, device 100 in FIG. 1 includes two surfaces 110 and 120 of a first structure spaced apart by less than or equal to an effective distance of the Casimir effect. The inventor believes that this distance is on the order of tens of nanometers, with the strength of the Casimir effect falling off with the $4^{th}$ power of distance. However, in the context of the invention, there is no particular requirement that the effective distance by limited to these particular distances, as a relatively small result from converting the Casimir effect may suffice for purposes to which the invention is put.

A second structure in the form of shields 130 are interposed between and surrounded by the two surfaces. These shields are preferably made of a suitable material such as metal or dielectric. In this figure, shields 130 exhibit a form of rotational symmetry: if each shield is rotated 90 degrees from its position relative to surface 120, it is positioned in a similar way as another shield. However, in the context of the invention, the shields need not exhibit such symmetry, and in some embodiments, they do not.

If the shields were not present, a net force vector 140 from the Casimir effect between the top portions of the two surfaces would be perpendicular to those portions, as shown. ("Top" refers to the orientation of FIG. 1, not to any particular embodiment of the invention. For example, if an embodiment were oriented differently, "top" might refer to a northern direction.) However, the top shields 130 alters the Casimir effect between those portions. This alteration is shown by net force vector 150. Thus, an effect of each shield is that a first net vector of force from the Casimir effect between portions of the two surfaces is different from a second net vector of force that would result from the Casimir effect between the portions if the shield was not present between the two surfaces. The altered net force vector can be used to generate, convert, or alter another force, field, or effect.

As a result of the altered net force vector, the region between the surfaces can be viewed as a novel composition of matter. This composition of matter can be described as including a quantum field operative in the region between surfaces 110 and 120, or described as a composition of matter having a quantum wave function with specific properties in the region between surfaces 110 and 120. This quantum field has a finite energy and being capable of exerting a first force such as net force vector 150. The distortion of the Casimir effect caused by shields 130 has the effect that this first force is different from a second force (e.g., force vector 140) associated with the Casimir effect.

It should be noted that the orientation of net force vector 150 in FIG. 1 is for illustrative purposes. In actual operation, the net force vector need not align with net force vector 150.

In a preferred embodiment, the two surfaces include a curved surface and a surface of a structure located within a non-infinite curvature of the curved surface. As shown in FIG. 1, the curved surface can be a ring-like structure such as a gear, and the structure located within the curvature of the curved surface can be a post located at a center of the ring-like structure. Alternatively, other types and shapes of surfaces can be used.

The altered net vector of force can apply a torque or a sheer force to one or both of the surfaces 110 and 120. For example, in FIG. 1, because net force vector 150 does not point to a center of the ring-like structure with surface 110, this net force vector exerts a torque on the ring-like structure. A similar torque results from other portions of the surfaces on the sides and bottom of the figure. If the ring-like structure and/or the post are free to rotate (i.e., spin), this torque from the Casimir effect should drive rotation (i.e., spinning) of either or both of the ring-like structure and the post.

This rotation (i.e., spinning) is significantly different from the attraction of two parallel plates together that has been used in prior-art attempts to extract or to convert energy using the Casimir effect. In particular, in a preferred embodiment, energy does not have to be put back into the system to "reset" the structures. Rather, the unaffected portions of the structures with surfaces 110 and 120 preferably are pulled along with the affected portions of the surfaces until they are in turn affected.

These forces can also be described in terms of a sheer force. Namely, the portion of net force vector 150 that does not point toward the center of the ring-like structure is a sheer force, which can cause the surface to slide relative to the other surface.

In some embodiments of the invention, either or both of the ring-like structure and the post is subject to a magnetic, electric, or electromagnetic force, field, or effect. For example, magnet 160 could be present near or within the structures. In the arrangement shown in FIG. 1, the magnetic field preferably would extend into or out of the plane of the figure. The invention is not limited to the arrangement or number of magnet(s) shown in the Figure.

If either or both of the ring-like structure and the post is subject to a magnetic field and is conductive, rotation of those structures as driven by the Casimir force could result in a current in the structures. In other words, with the arrangements disclosed herein, the Casimir effect is used to convert a magnetic field into a current. Equivalently, the magnetic field could be viewed as converting the Casimir effect into a current. This current can be drawn off using leads such as leads 170. These leads are shown attached to surface 110 of the ring-like structure. Alternatively, if the post rotates and is conductive, the leads could be attached to surface 120 of the post. Other arrangements of leads can be used depending on the particular design of the device.

The invention is not limited to the general arrangement shown in FIG. 1. For example, the Casimir effect could exist between surfaces of a ring-like structure and element(s) outside of the ring-like structure, and shields could be placed between those surfaces. Other arrangements are possible.

FIG. 1 shows an idealized arrangement that would be difficult to build using existing technology. Variations on this arrangement can be built using existing technology, for example e-beam lithography.

Figure 2:
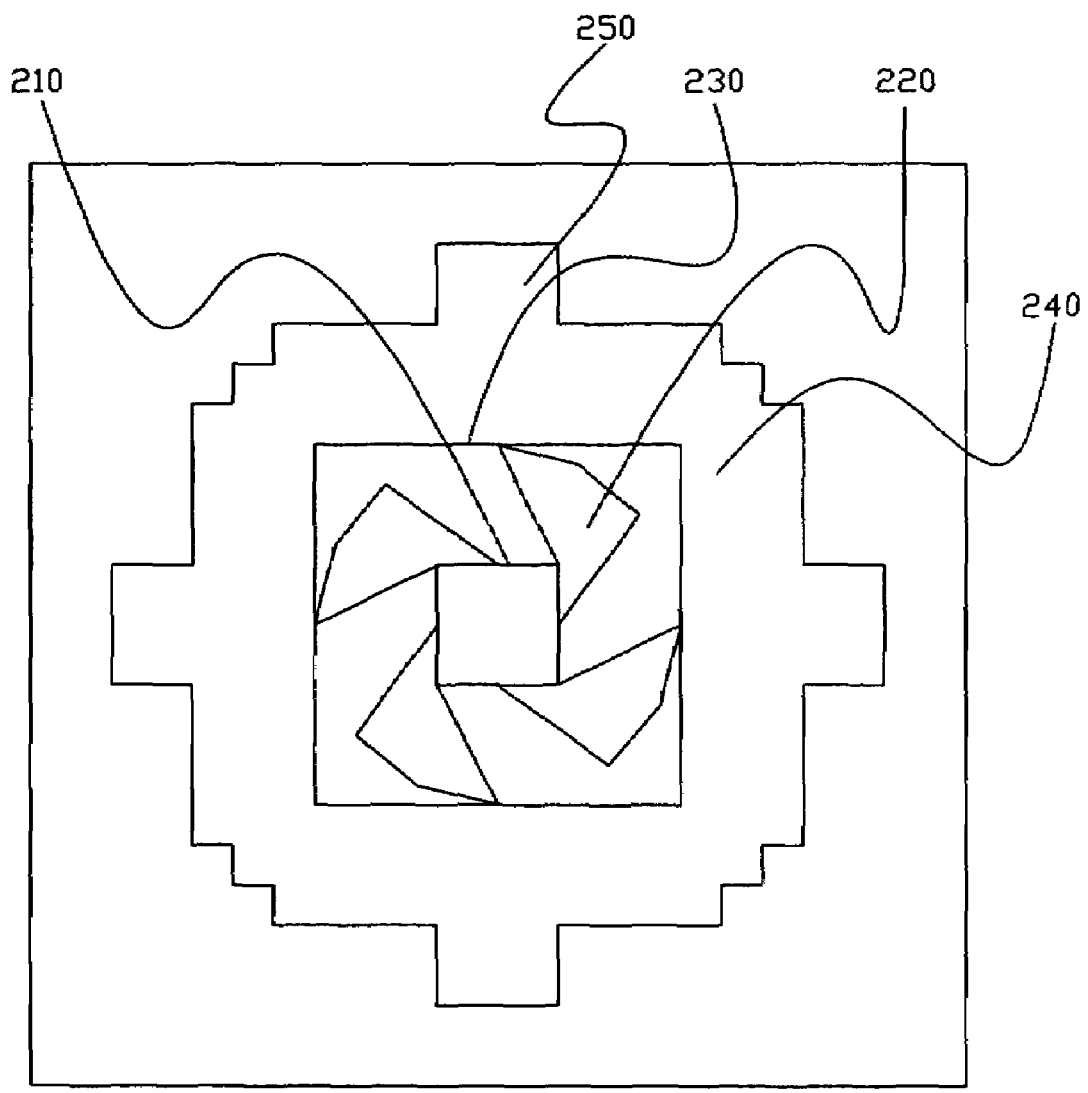
FIG. 2 shows a layout diagram of one possible layout of a lithographically etched device that uses the Casimir effect.

FIG. 2 shows one possible layout of a lithographically etched device that uses the Casimir effect. In this figure, the two surfaces are shown as surface 210 of post 220 and surface 230 of square-shaped ring-like structure 240. In this context, "ring-like" refers to a structure that surrounds another structure. There is no requirement that the ring-like structure be circular. In this layout, the ring-like structure further includes teeth 250 and therefore has functionality as a gear. Rotation of this gear as driven by the Casimir effect can be used to generate, convert, or alter another force, field, or effect according to the invention.

Figure 3:
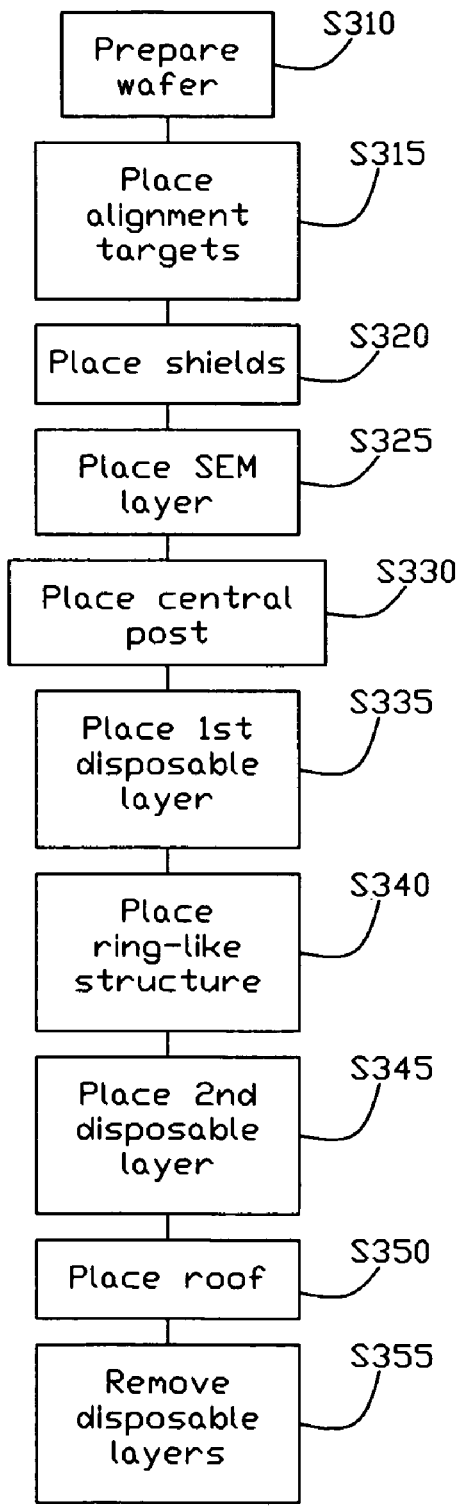
FIG. 3 shows a flow diagram including steps for one method of lithographically building the layout shown in FIG. 2.
Figure 11:
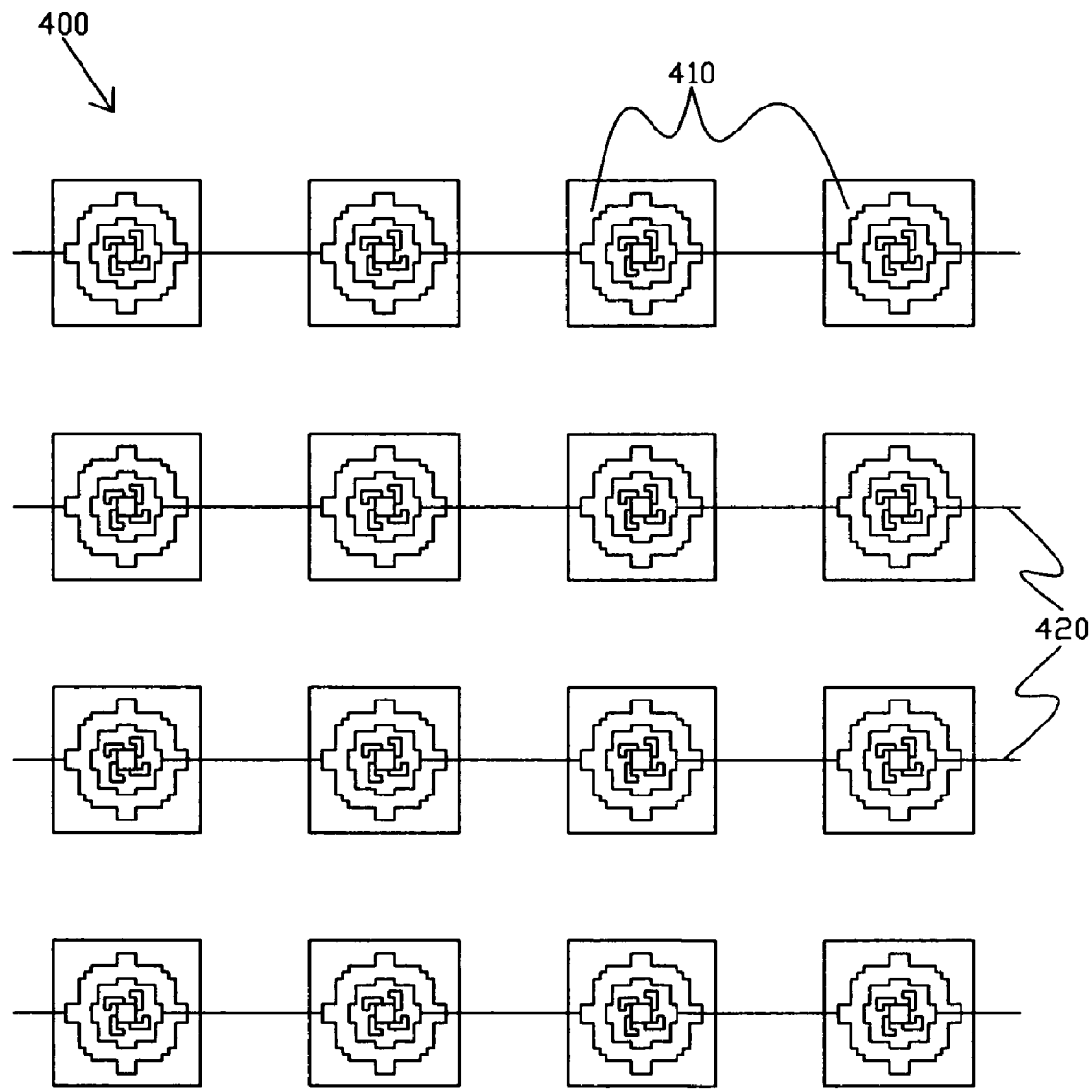
FIG. 11 shows a layout diagram of an array of lithographically etched devices that use the Casimir effect.
Figure 12:
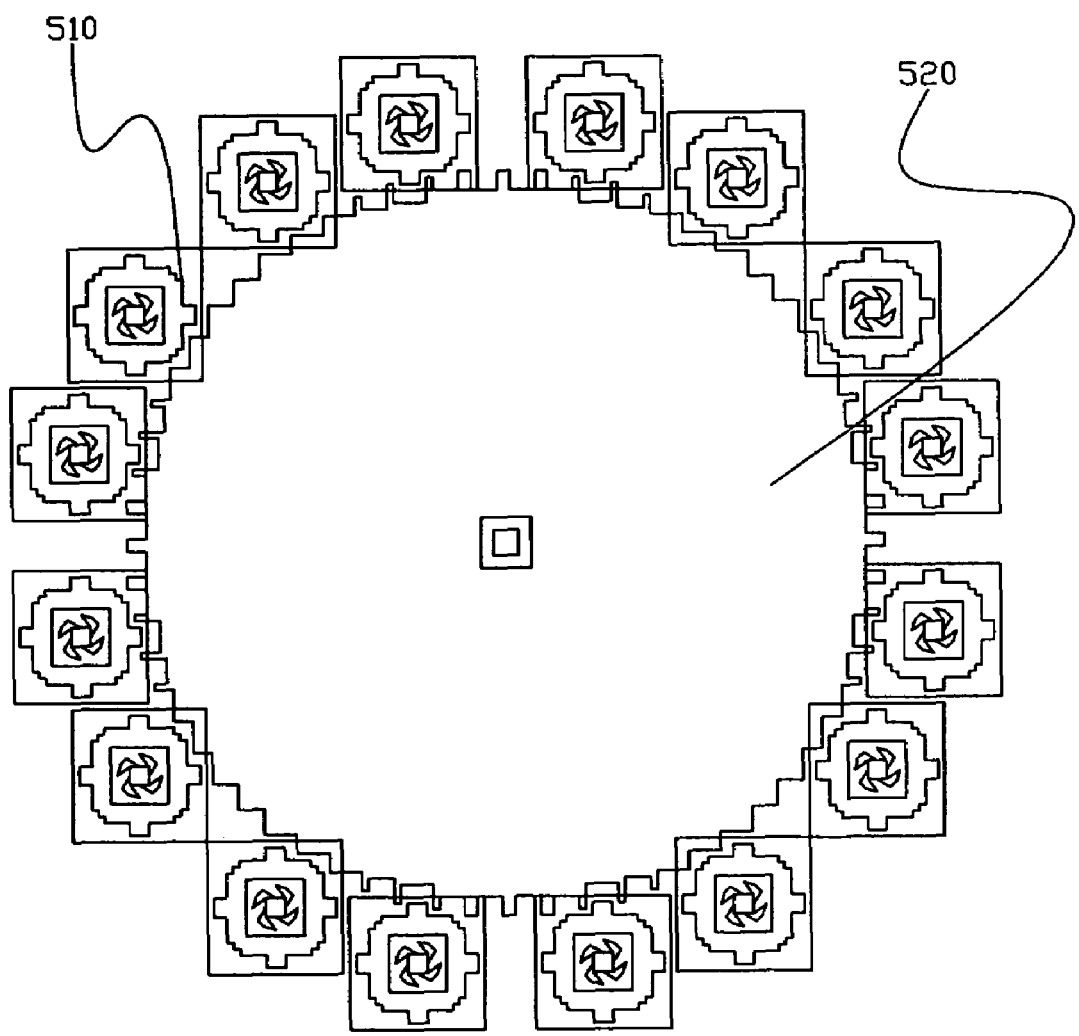
FIG. 12 shows a layout diagram of an arrangement in which plural lithographically etched devices that use the Casimir effect drive a larger gear.

FIG. 3 is a flow diagram showing steps for one method of lithographically etching the layout shown in FIG. 2. These steps are described with respect to a single device. However, in practice, an array or combination of such devices is deposited at once on a wafer, for example in a layout as shown in FIGS. 11 and 12.

In step S310, a silicon wafer is prepared, for example cleaned and baked to remove any residual water.

In S315, alignment targets are creadted on the wafer. This pattern is used to line up subsequent layers of the device. In this step, a photoresist is deposited onto the silicon wafer, a pattern for the alignment targets is etched into the photoresist using an e-beam or other etching technique, the etched pattern is developed, and a suitable target material such as tungsten is deposited. In one embodiment, about 10 nm of material is deposited for the targets. The target material lands on the wafer where the pattern was developed and on the photoresist where the pattern was not developed. The photoresist and the material deposited on the photoresist are then stripped, leaving the alignment targets.

Figure 4:
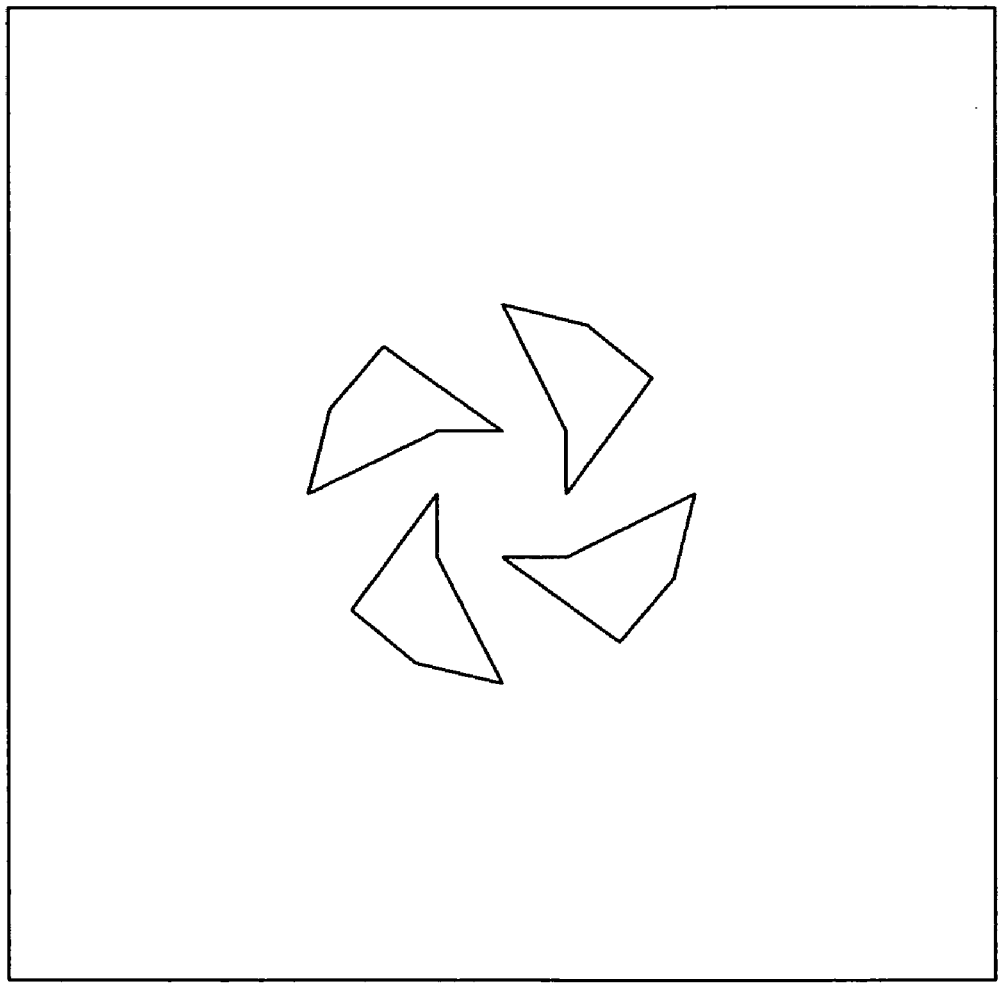
FIGS. 4 to 9 show layout diagrams of layers deposited as effects of the steps of FIG. 3.

The shields that affect the net vector of force from the Casimir effect are placed on the wafer in step S320. In this step, a photoresist is deposited onto the silicon wafer, a negative pattern of the shields (e.g., FIG. 4) is etched into the photoresist using an e-beam or other etching technique, the etched pattern is developed, and the wafer is bombarded with plasma to carve holes in the wafer around the shields. In one embodiment, the holes are about 90 nm deep. The photoresist is then stripped.

An aluminum layer is optionally deposited on the wafer in step S325. In one embodiment, this layer is 10 nm thick. This layer is helpful for viewing the finished layout with a scanning electron microscope to verify that the layout was built up properly. In actual production, this step can be skipped.

Figure 5:
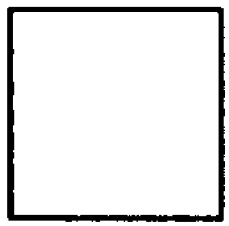

In step S330, the central post is placed on the wafer. In this step, a photoresist is deposited onto the silicon wafer, a pattern for the post (e.g., FIG. 5) is etched into the photoresist using an e-beam or other etching technique, the etched pattern is developed, and a suitable post material such as aluminum is deposited. In one embodiment, about 90 nm of material is deposited for the post. The post material lands on the wafer where the pattern was developed and on the photoresist where the pattern was not developed. The photo-resist and the material deposited on the photoresist are then stripped, leaving the post.

Figure 6:
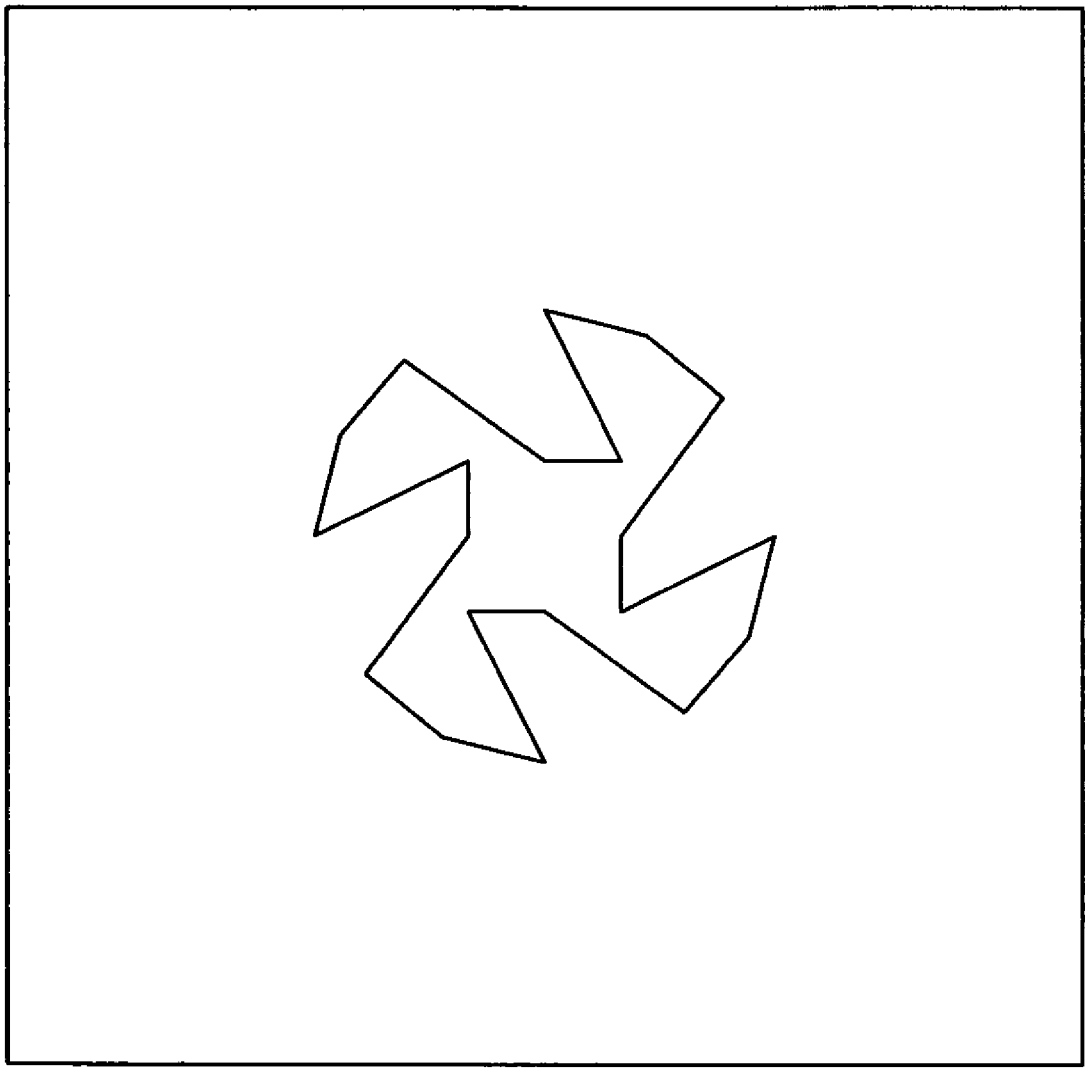

In step S335, a first disposable spacer layer is placed on the wafer. This layer is used to separate portions of the previous and subsequent layers from each other. In this step, a photoresist is deposited onto the silicon wafer, a pattern for the spacer layer (e.g., FIG. 6) is etched into the photoresist using an e-beam or other etching technique, the etched pattern is developed, and a suitable spacer material is deposited. This spacer material should be a material that can be removed without removing the silicon of the wafer or the material for the other structures of the device. Titanium is a suitable material for the spacer layer. In one embodiment, about 20 nm of material is deposited for the spacer layer. The spacer material lands on the wafer where the pattern was developed and on the photoresist where the pattern was not developed. The photoresist and the material deposited on the photoresist are then stripped, leaving the spacer layer.

Figure 7:
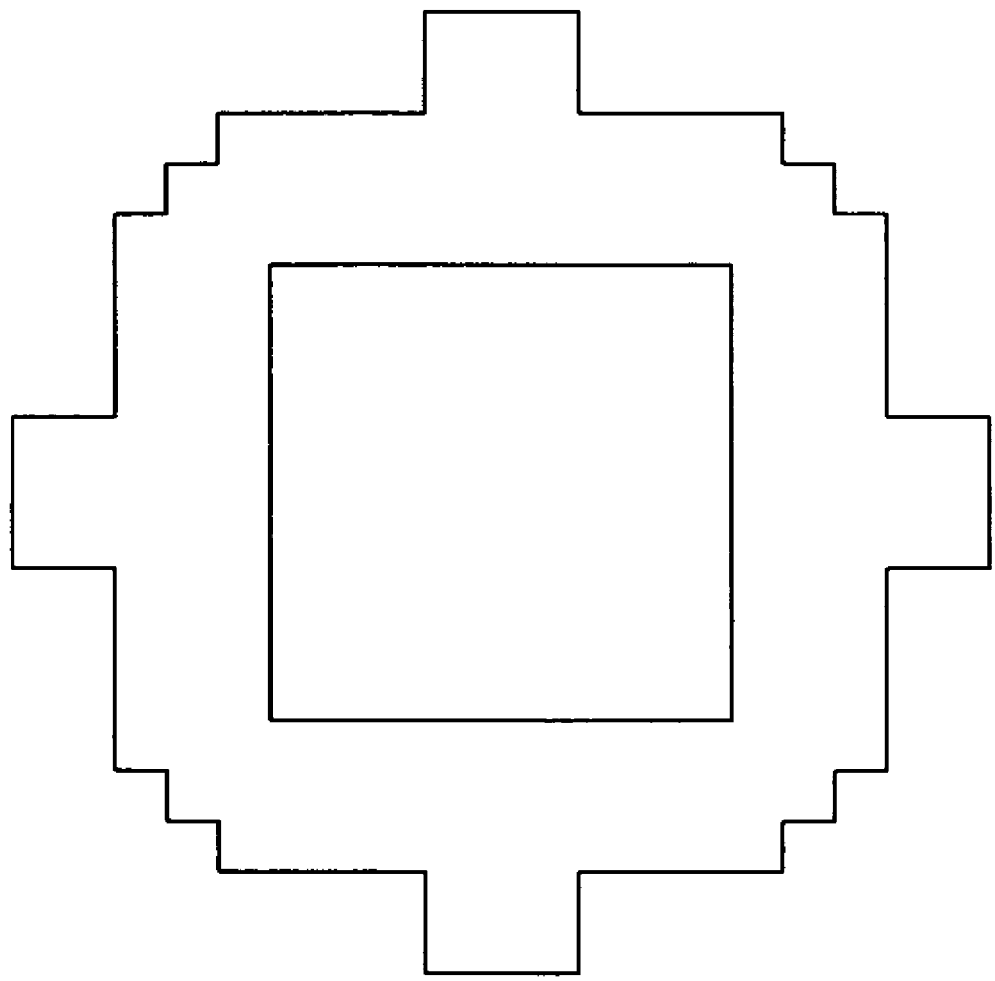

In step S340, the ring-like structure is placed on the wafer. In this case the ring-like structure is a gear. The gear should be free to rotate once the spacer layers are removed. In this step, a photoresist is deposited onto the silicon wafer, a pattern for the gear (e.g., FIG. 7) is etched into the photoresist using an e-beam or other etching technique, the etched pattern is developed, and a suitable gear material such as aluminum is deposited. In one embodiment, about 50 nm of material is deposited for the gear. The gear material lands on the wafer where the pattern was developed and on the photoresist where the pattern was not developed. The photoresist and the material deposited on the photoresist are then stripped, leaving the gear.

Figure 8:
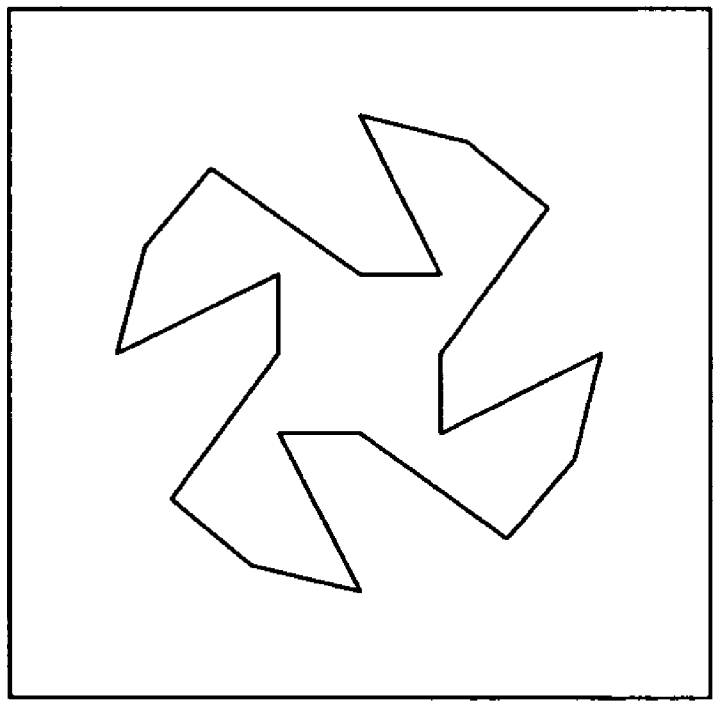

In step S345, a second disposable spacer layer is placed on the wafer. This layer is used to separate portions of the previous and subsequent layers from each other. In this step, a photoresist is deposited onto the silicon wafer, a pattern for the spacer layer (e.g., FIG. 8) is etched into the photoresist using an e-beam or other etching technique, the etched pattern is developed, and a suitable spacer material is deposited. This spacer material should be a material that can be removed without removing the silicon of the wafer or the material for the other structures of the device. Titanium is a suitable material for the spacer layer. In one embodiment, about 70 nm of material is deposited for the spacer layer. The spacer material lands on the wafer where the pattern was developed and on the photoresist where the pattern was not developed. The photoresist and the material deposited on the photoresist are then stripped, leaving the spacer layer.

Figure 9:
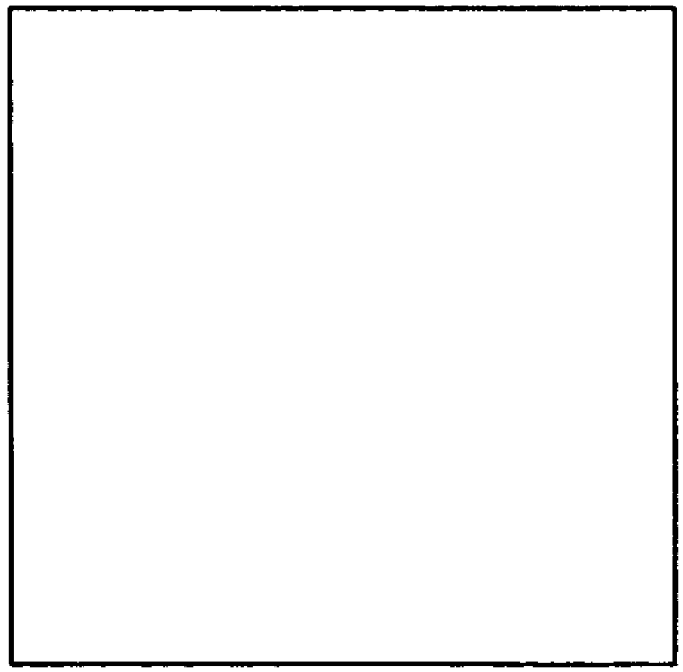

In step S350, a roof is placed on the wafer. The roof keeps the gear in place if the wafer with the device is turned upside down during use. In this step, a photoresist is deposited onto the silicon wafer, a pattern for the roof (e.g., FIG. 9) is etched into the photoresist using an e-beam or other etching technique, the etched pattern is developed, and a suitable roof material such as aluminum is deposited. In one embodiment, about 90 nm of material is deposited for the roof. The roof material lands on the wafer where the pattern was developed and on the photoresist where the pattern was not developed. The photoresist and the material deposited on the photoresist are then stripped, leaving the roof.

In step 355, the disposable spacer layers are removed. If the spacer layers are made of titanium, this step can be performed by exposing the wafer to 49% hydrogen fluoride (HF) for about 1 minute. This exposure will remove at least 1,000 nm of titanium, which is far more than necessary, while only removing minimal aluminum and negligible silicon.

At this point in the process, the device is complete. The Casimir effect should exist between the post and the ring-like structure (gear), with the results discussed herein.

Figure 10:
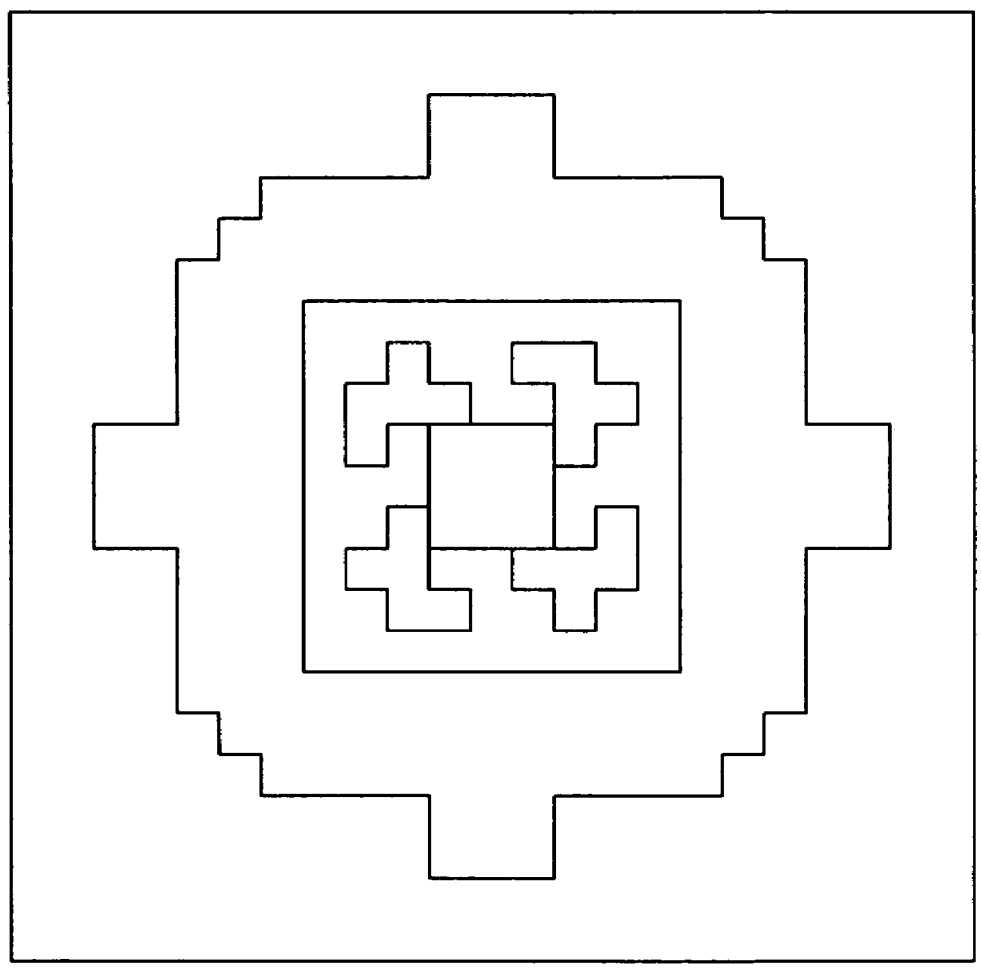
FIG. 10 shows a layout diagram of another possible layout of a lithographically etched device that uses the Casimir effect.

FIG. 10 shows another possible layout of a lithographically etched device that uses the Casimir effect. This layout is similar to the layout shown in FIG. 2, except that the components are shaped using Manhattan geometry. Certain types of lithography are constrained to Manhattan geometry, namely straight lines and right angles. Thus, this layout is suitable for those types of lithography.

Other types of lithography permit more flexibility in the lines and shapes that can be used. For example, the lithography described above with respect to FIGS. 3 to 9 is not restricted to Manhattan geometry, as is evident from the presence of angles different from right angles. Still other types of lithography permit some angles besides right angles, but not all angles. For example, some types of lithography permit 45 degree angles as well as right angles. Layouts with shapes that fall somewhere between the layouts in FIG. 2 and FIG. 10 can be used with these types of lithography.

The steps discussed above represent one contemplated approach. However, the devices disclosed herein can be manufactured using other steps and techniques, including techniques besides lithographic techniques. For example, other nanoscopic manufacturing techniques can be used to make devices similar to that described herein.

FIG. 11 shows an array 400 of lithographically etched devices 410 that use the Casimir effect. Because the effective range of the Casimir effect is relatively small, typically on the order of tens of nanometers, the devices tend to be very small. Many of the devices can be placed on a single chip. Thus, even though each of the devices might generate, convert, or alter a small amount of another force, field, or effect, the net effect of an array of the devices on a chip can be significant.

FIG. 11 also illustrates that current from plural devices 410 in array 400 can be combined, for example in series as shown using leads 420. The current also can be combined in parallel, as well as in other ways (e.g., a combination of series and parallel).

FIG. 12 shows an arrangement in which plural lithographically etched devices 500 that use the Casimir effect drive a larger gear 510. In this arrangement, the ring-like structure for each device is a gear, and the gears are arranged in aggregate to work together to drive larger gear 520.

In some embodiments, the larger gear can be subject to a magnetic, electric, or electromagnetic field. Thus, rotation of this larger gear can convert the magnetic field into a current. Equivalently, the rotation of the larger gear can be viewed as a result of converting the Casimir effect into a torque, and the magnetic field can be viewed as converting this torque into a current. Accordingly, the net effect (again) is to convert the Casimir effect into a current. The current preferably can be drawn off using one or more leads.

In other embodiments, larger gear 510 can be linked to another mechanical device to drive that device, for example a device that is too large to be driven by the smaller devices 500.

Generality of Invention

This application should be read in the most general possible form. This includes, without limitation, at least the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the context, scope and spirit of the invention, and these variations would become clear to those skilled in the art after perusal of this application.

The invention claimed is:

1. Apparatus comprising
   a first structure effective to generate a Casimir effect between at least portions thereof; and
   a second structure effective to alter or to convert the Casimir effect or a first type of force, field, or affect associated with the Casimir effect into a second type of force, field, or effect.

2. Apparatus as in claim 1, wherein the first structure includes a ring-like structure that spins as a result of the second type of force, field, or effect.

3. Apparatus as in claim 1, wherein
   the first type of force, field, or effect includes a linear force vector; and
   the second type of force, field, or effect includes a different linear force vector.

4. Apparatus as in claim 1, wherein
   the first type of force, field, or effect includes a linear force vector, and
   the second type of force, field, or effect includes a torque.

5. Apparatus as in claim 1, wherein
   the first structure includes elements effective to generate the Casimir effect; and
   the second structure includes an element substantially interposed between at least portions of the elements of the first structure.

6. Apparatus as in claim 1, wherein the first structure includes a first element and a second element surrounding the first element.

7. Apparatus as in claim 6, wherein the second element has rotational symmetry.

8. Apparatus as in claim 6, wherein the second element has a radius of curvature substantially less than infinite.

9. Apparatus as in claim 1, wherein the first structure includes a substantially planar element and the second structure includes an element having rotational symmetry.

10. Apparatus as in claim 1, wherein the first structure and the second structure are part of a same object or structure.

11. Apparatus as in claim 1, wherein alteration or conversion into the second type of force, field, or effect includes movement of all or part of the first structure or the second structure.

12. Apparatus as in claim 11, wherein the movement is rotation.

13. Apparatus as in claim 11, wherein the movement occurs in a presence of an electric, magnetic, or electromagnetic field.

14. Apparatus as in claim 11, wherein the second type of force, field, or effect includes an electric, magnetic, or electromagnetic force, field, or effect that results from the movement.

15. Apparatus as in claim 11, wherein the movement causes movement of a third structure larger than the first structure and the second structure.

16. Apparatus as in claim 15, wherein the movement of the third structure is used to drive another device.

17. A method comprising the steps of
   generating a Casimir effect between at least portions of a first structure; and
   altering or converting the Casimir effect or a first type of force, field, or affect associated with the Casimir effect into a second type of force, field, or effect with a second structure.

18. The method as in claim 17, wherein the first structure includes a ring-like structure that spins as a result of the second type of force, field, or effect.

19. The method as in claim 17, wherein
   the first type of force, field, or effect includes a linear force vector; and the second type of force, field, or effect includes a different linear force vector.

20. The method as in claim 17, wherein
the first type of force, field, or effect includes a linear force vector, and
the second type of force, field, or effect includes a torque.

21. The method as in claim 17, wherein
the first structure includes elements effective to generate the Casimir effect; and
the second structure includes an element substantially interposed between at least portions of the elements of the first structure.

22. The method as in claim 17, wherein the first structure includes a first element and a second element surrounding the first element.

23. The method as in claim 22, wherein the second element has rotational symmetry.

24. The method as in claim 22, wherein the second element has a radius of curvature substantially less than infinite.

25. The method as in claim 17, wherein the first structure includes a substantially planar element and the second structure includes an element have a radius of curvature substantially less than infinite.

26. The method as in claim 17, wherein the first structure and the second structure are part of a same object or structure.

27. The method as in claim 17, wherein the step of altering or converting includes moving all or part of the first structure or the second structure.

28. The method as in claim 27, wherein the moving is rotating.

29. The method as in claim 27, wherein the moving occurs in a presence of an electric, magnetic, or electromagnetic field.

30. The method as in claim 27, wherein the second type of force, field, or effect includes an electric, magnetic, or electromagnetic force, field, or effect that results from the moving.

31. The method as in claim 27, wherein the moving causes movement of a third structure.

32. The method as in claim 31, further comprising the step of using the movement of the third structure to drive another device.

33. A composition of matter, including
a quantum field operative in a region, that quantum field having a finite energy and being capable of exerting a first force;
wherein that quantum field includes a distortion from a Casimir effect, whereby that first force differs from a second force associated with that Casimir effect.

* * * * *